(12) United States Patent
Wilkinson et al.

(10) Patent No.: US 6,924,057 B2
(45) Date of Patent: Aug. 2, 2005

(54) ELECTROCHEMICAL FUEL CELL WITH AN ELECTRODE HAVING AN IN-PLANE NONUNIFORM STRUCTURE

(75) Inventors: David P. Wilkinson, North Vancouver (CA); Peter R. Gibb, Coquitlam (CA)

(73) Assignee: Ballard Power Systems Inc., Burnaby (CA)

( * ) Notice: Subject to any disclaimer, the term of this patent is extended or adjusted under 35 U.S.C. 154(b) by 386 days.

(21) Appl. No.: 10/072,813

(22) Filed: Feb. 8, 2002

(65) Prior Publication Data

US 2003/0082432 A1 May 1, 2003

Related U.S. Application Data

(63) Continuation of application No. 09/198,323, filed on Nov. 24, 1998, now abandoned.

(51) Int. Cl.$^7$ .............................. H01M 8/04; H01M 4/86
(52) U.S. Cl. .............................. 429/39; 429/40; 429/42; 429/44
(58) Field of Search .............................. 429/30, 39, 40, 429/42–45

(56) References Cited

U.S. PATENT DOCUMENTS

| | | | |
|---|---|---|---|
| 3,553,023 A | 1/1971 | Doyle | 136/86 |
| 4,459,342 A | 7/1984 | Shigeta et al. | 429/34 |
| 4,615,955 A | 10/1986 | Amakawa et al. | 429/34 |

(Continued)

FOREIGN PATENT DOCUMENTS

| | | |
|---|---|---|
| EP | 343679 B1 | 11/1989 |
| EP | 654837 A1 | 5/1995 |
| GB | 133882 | 10/1919 |
| GB | 2316802 | 3/1998 |
| JP | 3-222261 | 10/1991 |
| JP | 495357 | 3/1992 |
| JP | 10-92439 | 4/1998 |
| WO | WO 94/05049 | 3/1994 |
| WO | WO 94/11912 | 5/1994 |
| WO | WO 95/08851 | 3/1995 |
| WO | WO 95/22179 | 8/1995 |
| WO | WO 97/08766 | * 3/1997 |

OTHER PUBLICATIONS

Derwent WPI Accession No. 1998–123288/199812, Mar. 4, 1998.

English Abstract of Japanese Patent No. JP 10–92439, Apr. 10, 1998.

English Abstract of Japanese Patent No. JP 3–222261, Oct. 1, 1991.

English Translation of Japanese Patent No. 3–222261, Oct. 1, 1991.

St–Pierre et al., "Advanced Water Management Techniques For Solid Polymer Fuel Cells," *New Materials For Fuel Cell and Modern Battery System II*: Proceedings of the $2^{nd}$ International Symposium on New Materials for Fuel Cell and Modern Battery Systems II, Publisher: Ecole Polytechnique de Montreal, O. Savadogo and P.R. Roberge (eds.), Montreal, Quebec, Canada, Jul. 6–10, 1997, pp. 318–329.

(Continued)

*Primary Examiner*—Jonathan Crepeau
(74) *Attorney, Agent, or Firm*—Seed IP Law Group PLLC (57) ABSTRACT

In an improved electrochemical fuel cell assembly, a reactant flow path extends substantially linearly across the electrochemically active area of an electrode. The electrode has an in-plane nonuniform structure in its electrochemically active area as the active area is traversed in the direction of the substantially linear reactant flow path. Embodiments in which the structure of the fuel cell electrode varies substantially symmetrically along the reactant flow path are particularly preferred in fuel cells in which the flow direction of a reactant is periodically reversed.

6 Claims, 7 Drawing Sheets

U.S. PATENT DOCUMENTS

| | | |
|---|---|---|
| 4,804,592 A | 2/1989 | Vanderborgh et al. ........ 429/33 |
| 4,851,377 A | 7/1989 | Breault ....................... 502/101 |
| 4,855,193 A | 8/1989 | McElroy ...................... 429/30 |
| 5,252,410 A | 10/1993 | Wilkinson et al. ............. 429/33 |
| 5,260,143 A | 11/1993 | Voss et al. .................... 429/13 |
| 5,300,370 A | 4/1994 | Washington et al. .......... 429/34 |
| 5,558,948 A | 9/1996 | Doyon ......................... 429/40 |
| 5,677,073 A | 10/1997 | Kawatsu ...................... 429/22 |
| 5,702,839 A | 12/1997 | Frost et al. ................... 429/42 |
| 5,840,438 A | 11/1998 | Johnson et al. ............... 429/30 |
| 5,958,613 A | 9/1999 | Hamada et al. ............... 429/26 |
| 6,054,025 A | 4/2000 | Moriguchi et al. ......... 204/258 |

OTHER PUBLICATIONS

English Abstract of French Patent No. FR2381835, Oct. 27, 1978.

English Translation of Japanese Patent No. JP495357, Mar. 27, 1993.

English Abstract of Japanese Patent No. JP06150938, May 31, 1994.

English Abstract of Japanese Patent No. JP4622736, Jun. 29, 1971.

Neubrand, A., "Electrochemical processing of porosity gradients for the production of functionally graded materials," *Journal of Applied Electrochemistry 28*: 1179–1188, 1998.

\* cited by examiner

ELECTROCHEMICAL FUEL CELL WITH AN ELECTRODE HAVING AN IN-PLANE NONUNIFORM STRUCTURE

This application is a continuation of U.S. Ser. No. 09/198,323 filed Nov. 24, 1998, now abandoned.

BACKGROUND OF THE INVENTION

1. Field of the Invention

This invention relates generally to electrochemical fuel cells and, more particularly, to an electrochemical fuel cell assembly with an electrode having an in-plane nonuniform structure.

2. Description of the Related Art

Electrochemical fuel cells convert fuel and oxidant to electricity and reaction product. Solid polymer electrochemical fuel cells generally employ a membrane electrode assembly ("MEA") comprising a solid polymer electrolyte or ion exchange membrane disposed between two electrodes. The electrodes typically each comprise a substrate formed principally of a porous, electrically conductive sheet material, such as, for example, carbon fiber paper, carbon cloth or a composite material. The electrodes also comprise an electrocatalyst, disposed at the membrane/electrode substrate interfaces in the MEA, to induce the desired electrochemical reaction. The location of the electrocatalyst generally defines the electrochemically active area of the electrode or MEA.

Typically, the structure of the electrode and particularly the electrode substrate is substantially uniform, on a macroscopic scale, as it is traversed in-plane (that is, in the x- and y-directions, parallel to the planar major surfaces of the electrode substrate) at any depth.

In electrochemical fuel cells, the MEA is typically interposed between two substantially fluid impermeable separator plates (anode and cathode plates). The plates, which commonly have channels formed therein, act as current collectors, provide support to the MEA, provide means for access of the fuel and oxidant to the porous anode and cathode surfaces, respectively, and provide for the removal of product water formed during operation of the cells.

The conditions in an operating fuel cell vary significantly across the electrochemically active area of each electrode. For example, the water content of the each reactant streams varies as it moves in a reactant stream flow path across either electrode. In addition to the desired reactive component, the reactant stream may contain other components, such as carbon monoxide, which under certain conditions may be oxidized upon contact with certain electrocatalysts. Such oxidation will generally occur in a localized region in the inlet portion of the reactant flow path. Other conditions are more likely to occur in certain portions of the reactant flow path in a fuel cell, for example, reactant starvation, overheating, drying, flooding. Thus, the requirements and desired properties of the fuel cell electrode will be different in different regions.

Related U.S. Pat. No. 5,840,438 discloses the fuel cell performance benefits of imparting different fluid transport properties in a fuel cell electrode substrate, in a biased manner, between a reactant inlet and outlet. U.S. Pat. Nos. 4,851,377 and 5,702,839 disclose varying the electrocatalyst loading or composition, respectively, in a fuel cell electrode layer in a biased manner between a reactant inlet and outlet.

If the reactant flow path across the electrode is tortuous, it may be more difficult to provide the desired variation in electrode properties directly along the flow path. The reactant flow path may pass in and out of regions of the electrode in which the electrode properties have been modified to suit the conditions in the reactant stream.

It is particularly advantageous to incorporate an electrode having an in-plane nonuniform structure in a fuel cell in which the reactant travels in a substantially direct linear path across the electrode. In this configuration it is easier to control and attempt to optimize the variation in electrode properties along the reactant flow path. The variation in electrode properties may then be provided in a graded or banded manner as the electrode is traversed in-plane along such a substantially linear flow path.

If the reactant stream flow direction across the electrode is to be constant between an inlet and outlet, the variation is preferably provided in a biased manner along the path.

However, in a fuel cell in which the direction of flow of a reactant stream across an electrode is to be periodically reversed, it is desirable that the properties of the electrode vary in a substantially symmetrical manner, rather than in a biased manner, between the reactant inlet and outlet (which are periodically interchanging). This is preferred in order that the fuel cell performance is not significantly different for one reactant flow direction than the other.

BRIEF SUMMARY OF THE INVENTION

An improved electrochemical fuel cell assembly comprises:

(a) a first separator plate having a pair of oppositely facing major planar surfaces, and first and second ports;

(b) a second separator plate having a pair of oppositely facing major planar surfaces, and third and fourth ports;

(c) a membrane electrolyte interposed between the first and second separator plates;

(d) a first electrode interposed between the first plate and the membrane electrolyte, the first electrode comprising a first substrate having a pair of oppositely facing major planar surfaces and electrocatalyst associated therewith defining a first electrochemically active area; and (e) a second electrode interposed between the second separator plate and the membrane electrolyte, the second electrode comprising a substrate having a pair of oppositely facing major planar surfaces and electrocatalyst associated therewith defining a second electrochemically active area.

The improved electrochemical fuel cell assembly further comprises a first reactant flow path for directing a first reactant fluid stream, in either direction, between the first and second ports. The first reactant flow path extends substantially linearly across the first electrochemically active area, and the first electrode has an in-plane nonuniform structure in its electrochemically active area as the active area is traversed in the direction of the first reactant flow path, between the first and second ports.

Typically, the first and second electrochemically active areas have the same shape and area, and are aligned or superposed on one another in the fuel cell assembly.

In preferred embodiments, the structure of the fuel cell electrode varies substantially symmetrically as the electrochemically active area thereof is traversed in-plane in the direction of the first reactant flow path. Such embodiments are particularly preferred in fuel cells in which the flow direction of a reactant is periodically reversed, and the first and second ports alternate their functions as inlet and outlet ports. Such a mode of operation is described in U.S. patent application Ser. No. 08/980,496 entitled "Method and Apparatus for Distributing Water to an Ion-exchange Membrane in a Fuel Cell," filed on Dec. 1, 1997, now U.S. Pat. No. 5,935,726, which is incorporated herein by reference in its entirety.

Preferably the first electrochemically active area is rectangular, and the reactant flow path extends substantially linearly between opposite edges of the rectangular active area. The first reactant flow path preferably comprises a plurality of substantially parallel, straight channels formed in a major planar surface of the first separator plate adjacent the first electrode, with the channels extending across the first electrochemically active area.

An improved electrochemical fuel cell assembly may further comprise a second reactant flow path for directing a second reactant fluid stream, in either direction, between the third and fourth ports. Preferably the second reactant flow path also extends substantially linearly across the second electrochemically active area, and the second electrode has an in-plane nonuniform structure in its electrochemically active area as the active area is traversed in the direction of the second reactant flow path.

Thus, the anode or the cathode or both electrodes may have an in-plane nonuniform structure in their electrochemically active areas as their active areas are traversed in the direction of a substantially linear reactant flow path.

In particularly preferred embodiments of the foregoing fuel cell assemblies, the fluid transport properties of at least the first electrode substrate vary as it is traversed in-plane in the direction of the first reactant flow path. The fluid transport properties may vary in a biased manner or substantially symmetrically as the electrochemically active area thereof is traversed in-plane in the direction of the first reactant flow path. For example, the density, porosity, pore size, hydrophobicity or hydrophilicity of the first electrode substrate may increase or decrease as it is traversed in-plane in the direction of the first reactant flow path. Alternatively or in addition, the material composition of at least the first electrode substrate may vary as it is traversed in-plane in the direction of the first reactant flow path. Again, the material composition of the substrate may vary in a biased manner or substantially symmetrically. For example, the first electrode substrate may comprise a coating on one of the major planar surfaces thereof, and the area weight loading and/or composition of the coating may vary as the electrochemically active area of the first substrate is traversed in-plane in the direction of the first reactant flow path. Such a coating could be, for example a particulate carbon-based layer, or a polymeric coating such as an ion-conducting polymer or a hydrophobic polymer, such as tetrafluoroethylene. In embodiments in which the coating comprises an ion-conducting polymer, the equivalent weight of the polymer coating may vary as the electrochemically active area of the first substrate is traversed in-plane in the direction of the first reactant flow path.

In other embodiments the material composition of the electrocatalyst associated with at least the first electrode substrate may vary as the electrode is traversed in-plane in the direction of the first reactant flow path. For example, the electrocatalyst may contain different metals, different support materials, or have varying precious metal content. In any event, the electrocatalyst composition is selected to suit the localized conditions along the reactant flow path. For example, if in certain regions of the electrode the electrocatalyst is likely to be exposed to higher concentrations of impurities in the reactant stream, a catalyst which is more tolerant to, or is effective at removing or converting, such impurities may be incorporated in those regions. In other embodiments the area weight loading of the electrocatalyst associated with at least the first electrode substrate may vary as the electrode is traversed in-plane in the direction of the first reactant flow path.

In fuel cells in which the direction of flow of a reactant stream across an electrode is to be periodically reversed, it is particularly preferred that the material composition or loading of the electrocatalyst vary substantially symmetrically as the electrode is traversed in-plane in the direction of the first reactant flow path.

The embodiments defined above comprise an electrode or electrode substrate which, on a macroscopic scale, have an in-plane nonuniform structure. In other words, as the structure of the electrode or substrate is traversed parallel to its major planar surfaces at some depth, structural discontinuities (over and above those inherent in the microscopic structure of the bulk material) are encountered. Further, the in-plane structural nonuniformities in the substrate may be distributed evenly (for example, in a regularly spaced pattern) or may be distributed unevenly.

BRIEF DESCRIPTION OF THE SEVERAL VIEWS OF THE DRAWINGS

FIGS. 2A–2D are plan views of components of a solid polymer fuel cell assembly in which the flow path, for directing reactant fluid streams in contact with the electrodes of the MEA, extends substantially linearly across the electrochemically active area of a rectangular MEA.

DETAILED DESCRIPTION OF PREFERRED EMBODIMENTS

Figure 1:
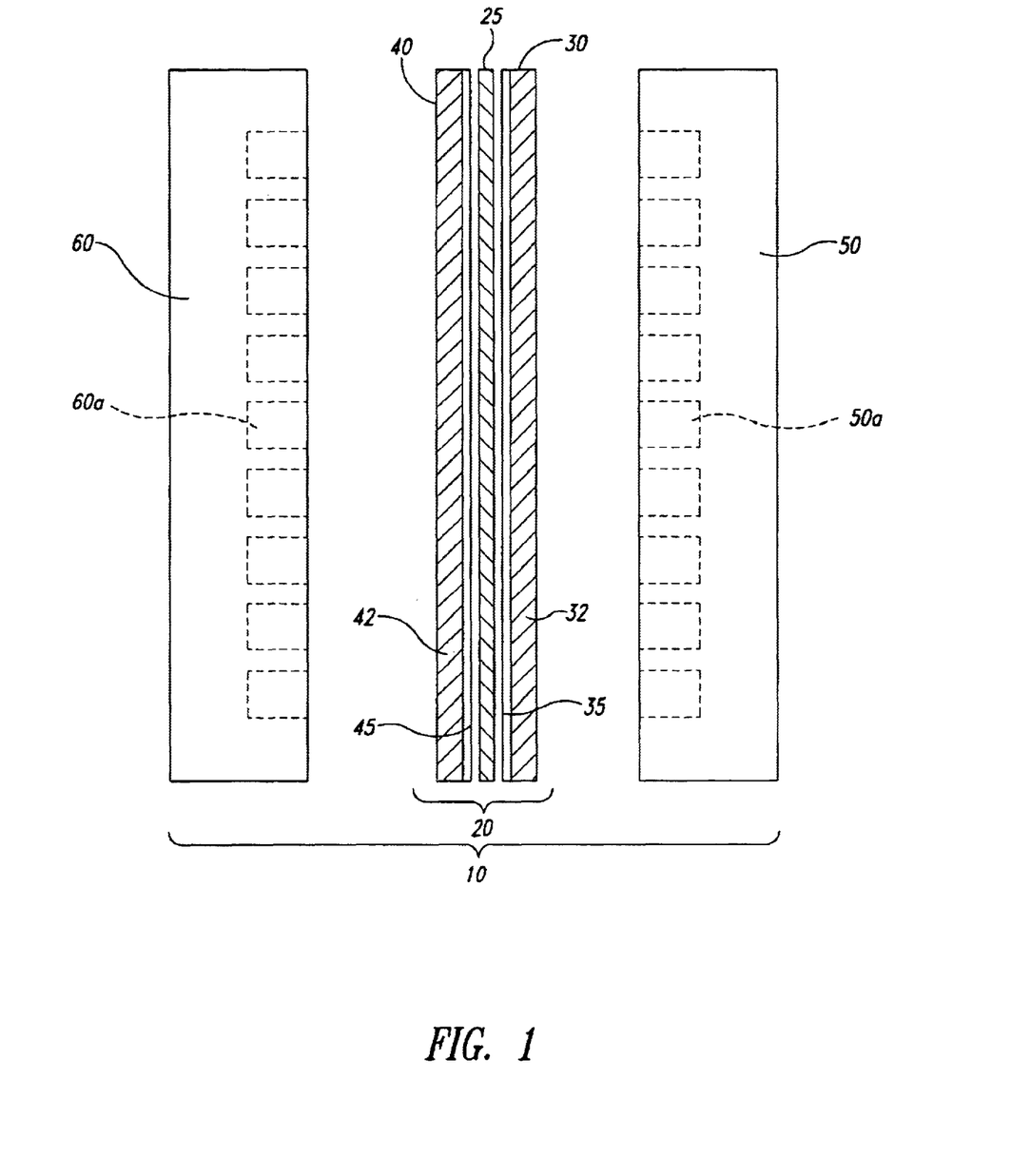
FIG. 1 is an exploded side cross-sectional view of a solid polymer fuel cell assembly comprising a membrane electrode assembly interposed between two separator plates having reactant flow channels formed in the surfaces facing the electrodes.

FIG. 1 illustrates a typical solid polymer fuel cell assembly 10. Fuel cell assembly 10 includes membrane electrode assembly 20 interposed between cathode flow field or separator plate 50 and anode flow field or separator plate 60.

Membrane electrode assembly 20 comprises an ion exchange membrane 25 interposed between two electrodes, namely, cathode 30 and anode 40. In conventional fuel cells, cathode 30 and anode 40 comprise a substrate of porous electrically conductive sheet material 32 and 42, respectively, for example, carbon fiber paper or carbon cloth or a composite material. Substrates 32, 42 each have a pair of oppositely facing major planar surfaces. Each substrate has a thin layer of electrocatalyst 35 and 45, respectively, disposed on one of the major surfaces at the interface with membrane 25 to render each electrode electrochemically active.

As further shown in FIG. 1, cathode separator plate 50 has at least one oxidant stream flow channel 50a formed in the surface which faces cathode 30. Similarly, anode separator plate 60 has at least one fuel stream flow channel 60a formed in the surface which faces anode 40. When assembled against the cooperating surfaces of electrodes 30 and 40, channels 50a and 60a form reactant flow field passages for the oxidant and fuel stream, respectively.

Figure 2A:
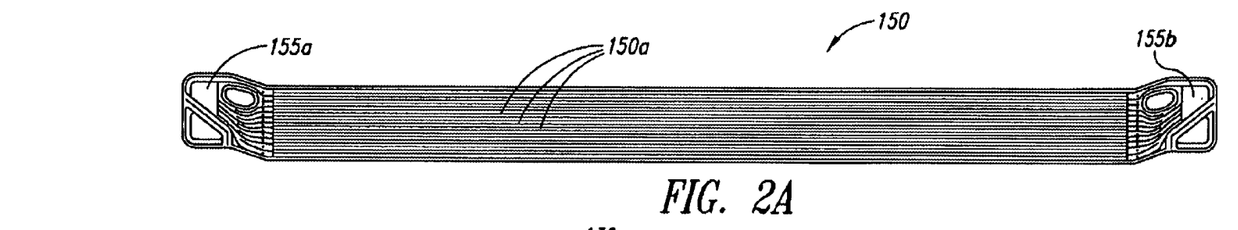
FIGS. 2A and 2C are plan views of cathode and anode flow field plates, respectively.
Figure 2B:
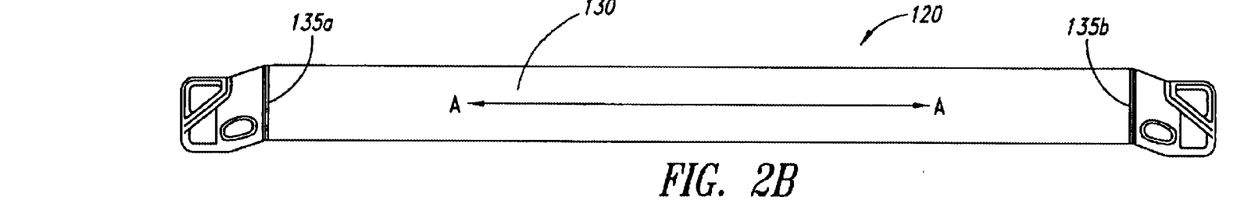
FIG. 2B is plan view of one major surface of an MEA.
Figure 2C:
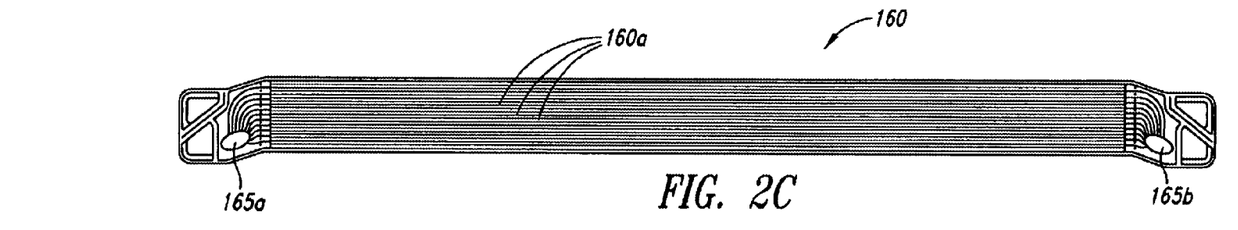

FIGS. 2A–2C show plan views of components of a solid polymer fuel cell assembly, which may be stacked (for example, as shown in FIG. 1) to form a single cell, with MEA 120 interposed between the illustrated surfaces of cathode flow field plate 150 and anode flow field plate 160. Cathode flow field plate 150 has a plurality of parallel channels 150a formed in the surface thereof which is adjacent the electrochemically active area of the adjacent cathode 130. Channels 150a are for directing an oxidant stream (in either direction) between first and second ports 155a and 155b formed in cathode plate 150. Similarly, anode flow field plate 160 has a plurality of parallel channels 160a formed in the surface thereof which is adjacent the electrochemically active area of the adjacent anode (not shown—on the reverse face of MEA 120). Channels 160a are for directing an fuel stream (in either direction) between first and second ports 165a and 165b formed in anode plate 160. In a fuel cell stack comprising a plurality of such fuel cells, ports formed in each of the plates align to form internal manifolds extending through the stack in the layered direction, with sealing provided as necessary. MEA 120 comprises cathode 130, an ion exchange membrane and an anode (both of which are obscured by cathode 130 in FIG. 2B). In the illustrated embodiment, the electrodes and membrane are rectangular, as indicated by the central portion of FIG. 2B, which also indicates the electrochemically active area of each electrode in which electrocatalyst is disposed. The remaining portion of MEA 120, in which the six port openings, are formed, may be made of a different material, for example, a plastic material.

Thus, in the fuel cell assembly of FIG. 2, the oxidant flow path includes channels 150a and passages extending within the adjacent porous cathode material. The flow path extends substantially linearly (generally in the direction of the line marked A—A) across the electrochemically active area of cathode 130 from edge 135a to opposite edge 135b, between ports 155a and 155b. Similarly, the fuel flow path includes channels 160a and passages extending within the adjacent porous anode material, and it extends substantially linearly (again, generally in the direction of the line marked A—A) across the electrochemically active area of the anode from edge 135a to opposite edge 135b, between ports 165a and 165b.

Figure 2D:
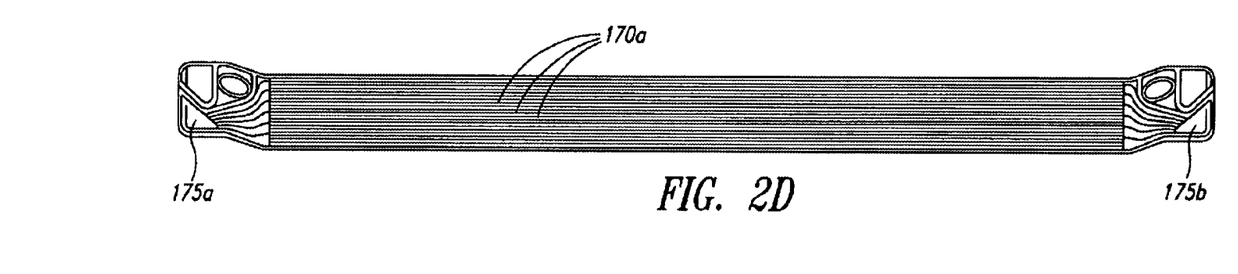
FIG. 2D is a plan view of the opposite surface of the anode plate of FIG. 2C, showing a coolant flow field.

FIG. 2D illustrates a coolant flow field formed on the reverse side of anode plate 160 shown in FIG. 2C. In the illustrated embodiment, this surface of anode plate 160 has a plurality of parallel channels 170a formed in the surface thereof superposing the electrochemically active area of the adjacent MEA 120 (or pair of MEAs in a stack). Channels 170a are for directing a coolant (in either direction) between first and second ports 175a and 175b formed in anode plate 160.

Figure 3A:
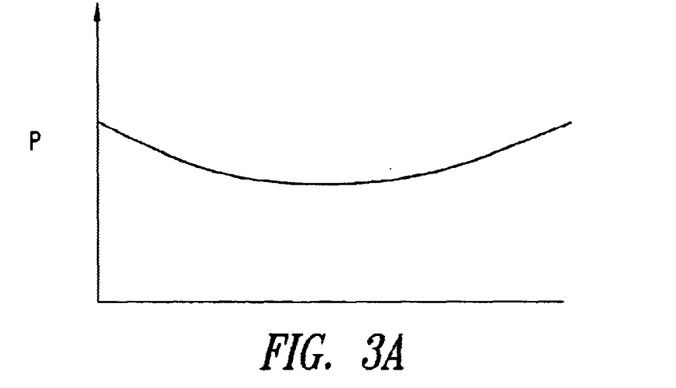
FIGS. 3A–3C illustrate graphically examples of how various properties of a fuel cell electrode of FIG. 2 may vary symmetrically as the electrochemically active area of the electrode is traversed in-plane in the direction of the reactant flow path.
Figure 3B:
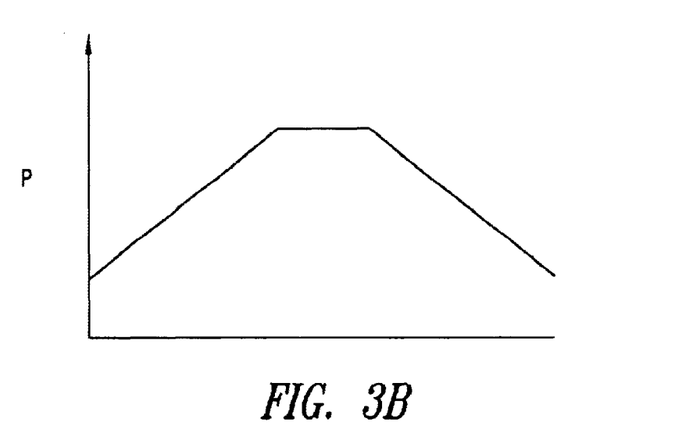
Figure 3C:
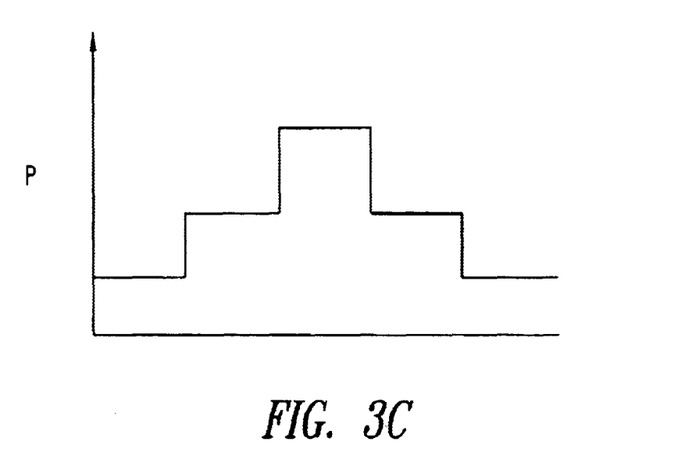

FIGS. 3A–3C illustrate graphically examples of how various properties of a fuel cell electrode of FIG. 2 may vary symmetrically as the electrochemically active area of the electrode is traversed in a plane in the direction of the reactant flow path, for example, between edges 135a and 135b of cathode 130 in FIG. 2B. The symbol "P" represents some property of the electrode, and preferably of the electrode substrate. For example, P could represent the porosity, density or pore size or some other physical property of the electrode substrate. It could represent the quantity of some component present in the electrode substrate, for example the area weight loading of a polytetrafluoroethylene binder or coating, or another polymer or ionomer component. In other embodiments it could represent the electrocatalyst loading in the electrode, or the loading of some other catalyst. For example, FIG. 3A could represent the loading of a selective oxidation catalyst incorporated in a fuel cell anode. In each case the property varies symmetrically as the electrochemically active area of the electrode is traversed in a plane in the direction of the reactant flow path. This is especially desirable in a fuel cell in which the flow direction of a reactant is to be periodically reversed.

Figure 4A:
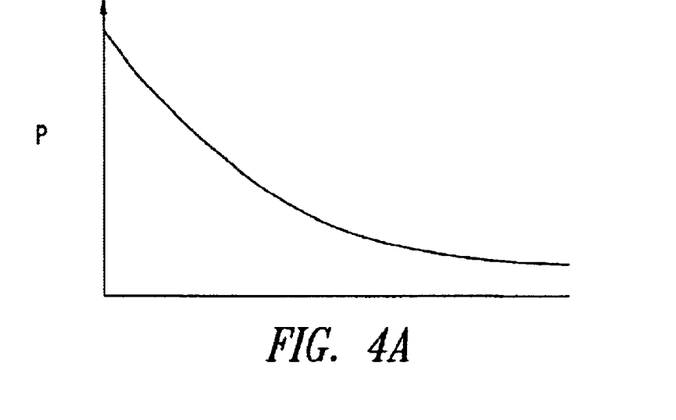
FIGS. 4A–4C illustrate graphically examples of how various properties of a fuel cell electrode may vary in a biased manner as the electrochemically active area of the electrode is traversed in-plane in the direction of the fuel cell reactant flow path.
Figure 4B:
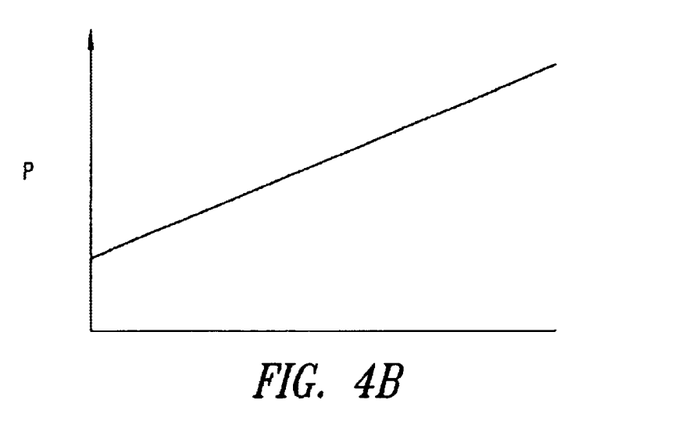
Figure 4C:
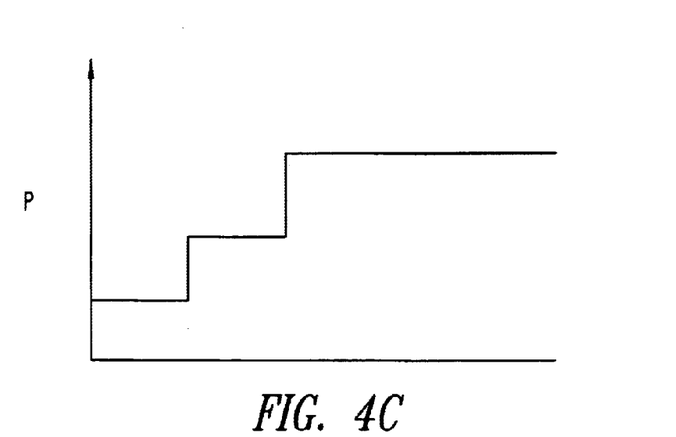

FIGS. 4A–4C illustrate graphically examples of how various properties of a fuel cell electrode of FIG. 2 may vary in a biased manner as the electrochemically active area of the electrode is traversed in a plane in the direction of the reactant flow path, for example, between edges 135a and 135b of cathode 130 in FIG. 2B. Again, the symbol "P" represents some property of the electrode, and preferably of the electrode substrate as described above. This biased variation is generally preferred when the flow direction of a reactant in the operating fuel cell is to be constant, and it is desirable to impart different properties in the electrode between the reactant inlet and outlet. It is particularly desirable to impart biased fluid transport properties in the electrode substrate, between the inlet and outlet regions of the flow path.

As indicated in both FIGS. 3 and 4, the property of the electrode may vary gradually in a smooth curve or in a substantially linear fashion, or in a step-wise or discontinuous manner.

Figure 5A:
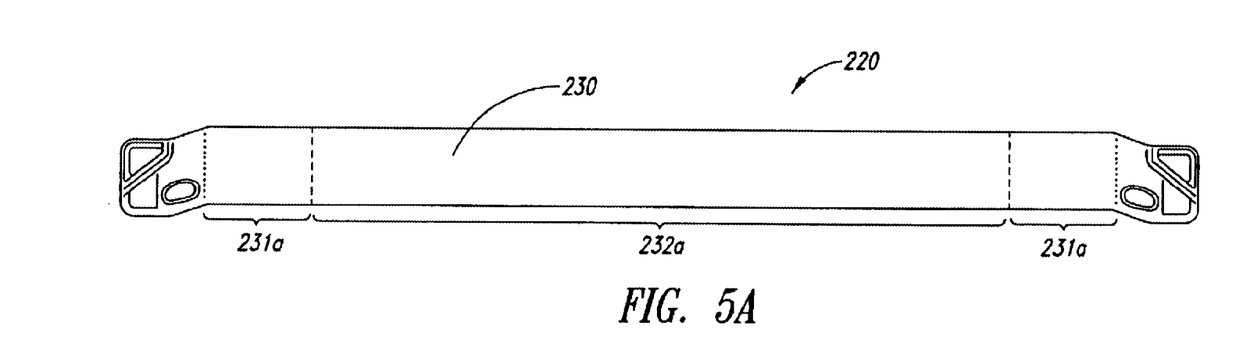
FIGS. 5A–5C illustrate schematically in plan views examples of how different in-plane regions or zones of a fuel cell electrode may have differing material compositions.
Figure 5B:
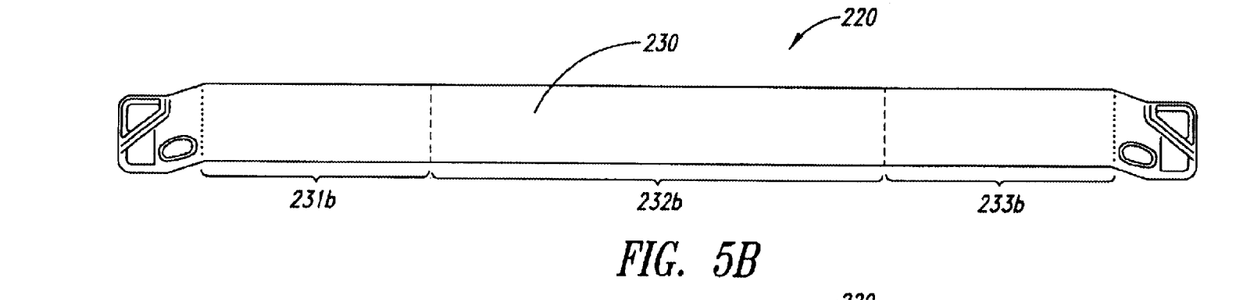
Figure 5C:
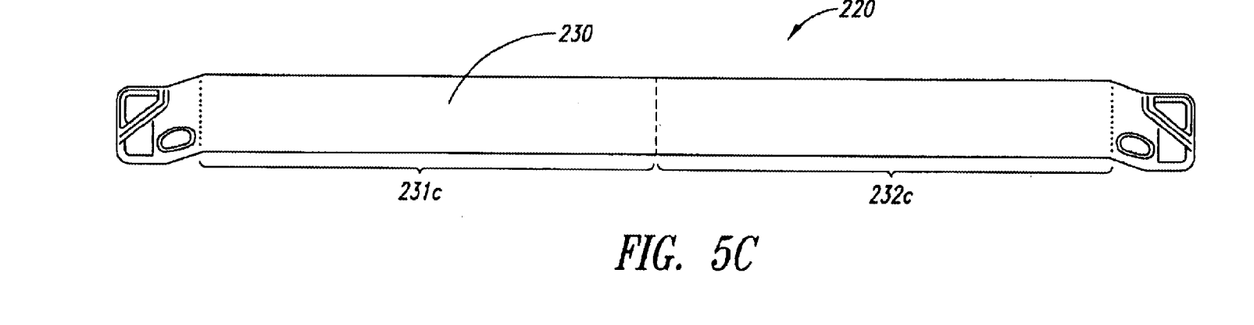

FIGS. 5A–5C illustrate schematically in plan views examples of how different in-plane regions or zones of a fuel cell electrode 230 in MEAs 220 may have differing material compositions. In FIG. 5A the variation in composition is substantially symmetrical, whereas in FIGS. 5B and 5C it is biased. For example, in FIG. 5A regions of electrode 230 marked 231a may comprise a different type of electrocatalyst than central region marked 232a. For example, the electrocatalyst may comprise different precious metal, or a different support material, or a different percentage loading of metal on a support. Alternatively, if the electrode includes a composite substrate with an electrically conductive fill incorporated into some kind of web or mesh material, the fill in regions 231a may differ in composition from the fill in region 232a. In FIG. 5B, regions 231b, 232b and 233b all have differing compositions, for example, the equivalent weight of an ion-conducting polymeric coating applied to the electrode substrate may be different in each of the regions. In FIG. 5C, regions 231c and 232c have differing compositions, for example region 231c of electrode 230 may have electrocatalyst and a selective oxidation catalyst incorporated therein, whereas region 232c may have only the electrocatalyst.

Figure 6A:
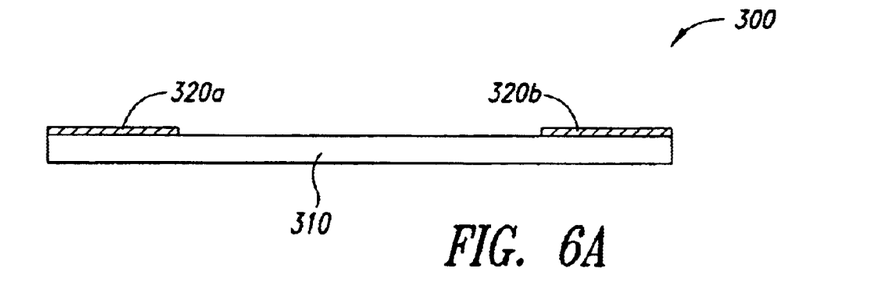
FIGS. 6A–6D illustrate schematically in side cross-sectional views examples of how different in-plane regions or zones of a of a fuel cell electrode substrate may have differing material compositions.
Figure 6B:
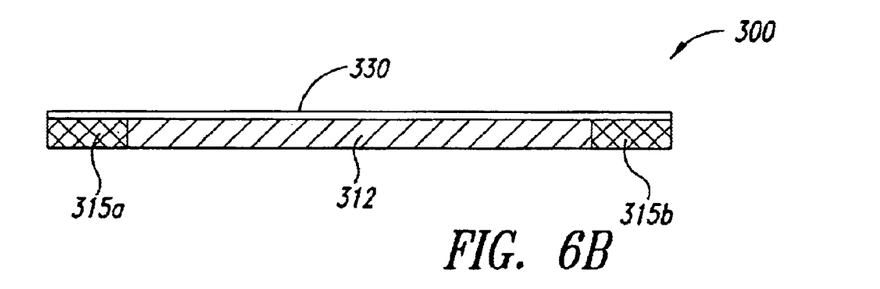
Figure 6C:
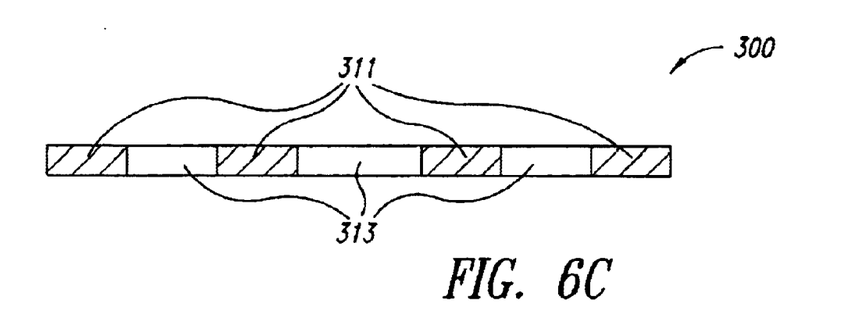
Figure 6D:
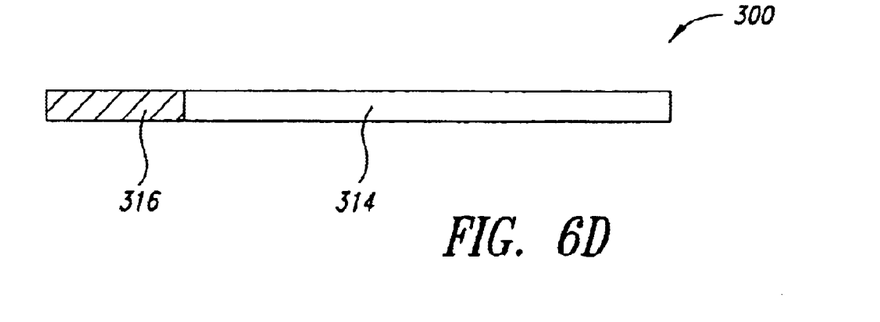

FIGS. 6A–6D illustrate schematically in side cross-sectional views examples of how different in-plane regions or zones of a fuel cell electrode substrate 300 may have differing material compositions. For example, in FIG. 6A, electrode substrate 300 comprises a porous electrically conductive sheet material 310, such as carbon fiber paper (which is substantially uniform, on a macroscopic scale, as it is traversed in-plane), with a coating 320a and 320b disposed on localized portions of sheet material 310. The coatings 320a and 320b may have the same or differing compositions. In FIG. 6B, substrate 310 includes a coating 330, which is disposed substantially uniformly over the entire area of a porous layer, which itself has an in-plane nonuniform structure. The porous layer could be, for example, a plastic mesh with an electrically conductive carbon-based fill disposed therein. The composition of the fill may be different in regions 312, 315a and 315b. In FIG. 6B, the in-plane nonuniformity is distributed evenly across substrate 310. For example, regions 311 of substrate 310 could be impregnated with a polymer which is not present in regions 313. In FIG. 6D, regions 314 and 316 may both comprise a particulate carbon material, but region 316 may include a different type of particulate carbon which is more robust under oxidizing conditions.

Figure 7:
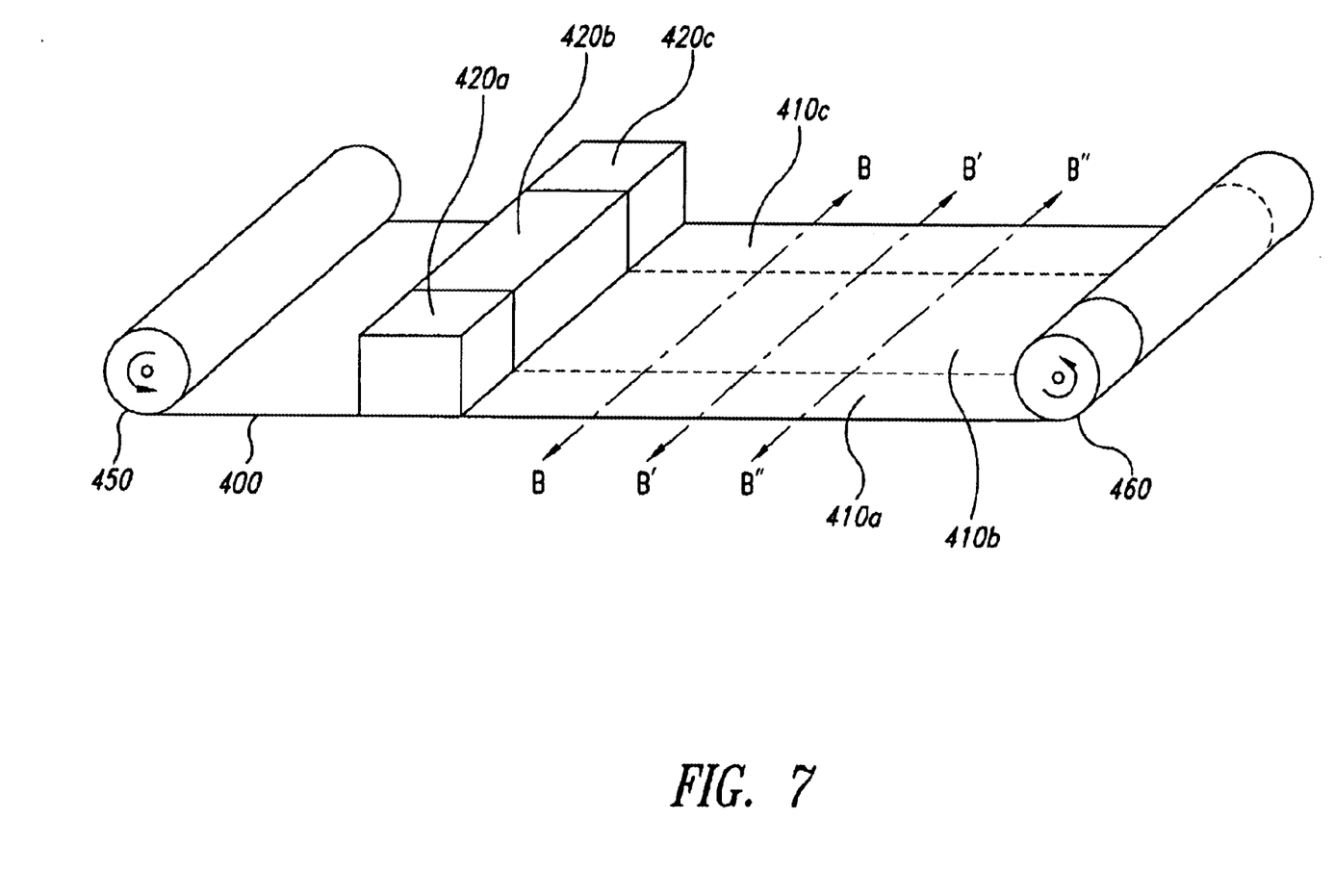
FIG. 7 is a schematic illustration of a reel-to-reel process for preparation of rectangular electrodes which have symmetrical or biased in-plane nonuniform structures.

FIG. 7 is a schematic illustration of a reel-to-reel process for preparation of rectangular electrodes or electrode substrates which have symmetrical or biased in-plane nonuniform structures. The electrode substrate material 400 is preferably flexible and suited for handling in a reel-to-reel type continuous process. FIG. 7 illustrates the ease with which electrodes, particularly rectangular electrodes with edge-to edge banded variations in properties, may be prepared in a high volume manufacturing process. As it passes from reel 450 to reel 460, substrate 400 can conveniently be subjected to one or more treatment steps selectively in different regions or bands. For example, porous substrate 400 may be subjected to differing compression forces on passing through treatment device sections 420a–c (which could be variable pressure rollers), resulting in a treated material having differing densities in bands 410a–c. Different catalyst compositions may be deposited on substrate 400 in treatment device sections 420a–c, resulting in a catalyzed substrate material having differing catalysts arranged in bands 410a–c. Lines B—B, B'—B' and B"—B" in FIG. 7 indicate how the treated material may ultimately be cut into discrete rectangular electrode pieces. Such pieces have non-uniformity as they are traversed in-plane in one direction from one edge to the opposite edge, but not as they are traversed in-plane between the other pair of edges (in the orthogonal in-plane direction).

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An electrochemical fuel cell assembly comprising:
a first separator plate having a pair of oppositely facing major planar surfaces, and first and second ports;
a second separator plate having a pair of oppositely facing major planar surfaces, and third and fourth ports;
a membrane electrolyte interposed between said first and second separator plates;
a first electrode interposed between said first plate and said membrane electrolyte, said first electrode comprising a first substrate having a pair of oppositely facing major planar surfaces and electrocatalyst associated therewith defining a first electrochemically active area; and
a second electrode interposed between said second separator plate and said membrane electrolyte, said second electrode comprising a substrate having a pair of oppositely facing major planar surfaces and electrocatalyst associated therewith defining a second electrochemically active area;
said electrochemical fuel cell assembly further comprising a first reactant flow path for directing a first reactant fluid stream between said first and second ports, wherein said first reactant flow path extends substantially linearly across said first electrochemically active area, and the density of said first electrode substrate increases as it is traversed in-plane in the direction of said first reactant flow path, and wherein said first electrode is a cathode.

2. An electrochemical fuel cell assembly comprising:
a first separator plate having a pair of oppositely facing major planar surfaces, and first and second ports;
a second separator plate having a pair of oppositely facing major planar surfaces, and third and fourth ports;
a membrane electrolyte interposed between said first and second separator plates;
a first electrode interposed between said first plate and said membrane electrolyte, said first electrode comprising a first substrate having a pair of oppositely facing major planar surfaces and electrocatalyst associated therewith defining a first electrochemically active area; and
a second electrode interposed between said second separator plate and said membrane electrolyte, said second electrode comprising a substrate having a pair of oppositely facing major planar surfaces and electrocatalyst associated therewith defining a second electrochemically active area;
said electrochemical fuel cell assembly further comprising a first reactant flow path for directing a first reactant fluid stream between said first and second ports, wherein said first reactant flow path extends substantially linearly across said first electrochemically active area, and the porosity of said first electrode substrate increases as it is traversed in-plane in the direction of said first reactant flow path, and wherein said first electrode is a cathode.

3. An electrochemical fuel cell assembly comprising:
a first separator plate having a pair of oppositely facing major planar surfaces, and first and second ports;
a second separator plate having a pair of oppositely facing major planar surfaces, and third and fourth ports;
a membrane electrolyte interposed between said first and second separator plates;
a first electrode interposed between said first plate and said membrane electrolyte, said first electrode comprising a first substrate having a pair of oppositely facing major planar surfaces and electrocatalyst associated therewith defining a first electrochemically active area; and
a second electrode interposed between said second separator plate and said membrane electrolyte, said second electrode comprising a substrate having a pair of oppositely facing major planar surfaces and electrocatalyst associated therewith defining a second electrochemically active area;

said electrochemical fuel cell assembly further comprising a first reactant flow path for directing a first reactant fluid stream between said first and second ports, wherein said first reactant flow path extends substantially linearly across said first electrochemically active area, and the pore size of said first electrode substrate increases as it is traversed in-plane in the direction of said first reactant flow path, and wherein said first electrode is a cathode.

4. An electrochemical fuel cell assembly comprising:

a first separator plate having a pair of oppositely facing major planar surfaces, and first and second ports;

a second separator plate having a pair of oppositely facing major planar surfaces, and third and fourth ports;

a membrane electrolyte interposed between said first and second separator plates;

a first electrode interposed between said first plate and said membrane electrolyte, said first electrode comprising a first substrate having a pair of oppositely facing major planar surfaces and electrocatalyst associated therewith defining a first electrochemically active area; and a second electrode interposed between said second separator plate and said membrane electrolyte, said second electrode comprising a substrate having a pair of oppositely facing major planar surfaces and electrocatalyst associated therewith defining a second electrochemically active area;

said electrochemical fuel cell assembly further comprising a first reactant flow path for directing a first reactant fluid stream between said first and second ports, wherein said first reactant flow path extends substantially linearly across said first electrochemically active area, and the material composition of the electrocatalyst associated with said first electrode substrate varies as said electrode is traversed in-plane in the direction of said first reactant flow path.

5. The electrochemical fuel cell assembly of claim 4 wherein the material composition of said electrocatalyst varies substantially symmetrically as said electrode is traversed in-plane in the direction of said first reactant flow path.

6. An electrochemical fuel cell assembly comprising:

a first separator plate having a pair of oppositely facing major planar surfaces, and first and second ports;

a second separator plate having a pair of oppositely facing major planar surfaces, and third and fourth ports;

a membrane electrolyte interposed between said first and second separator plates;

a first electrode interposed between said first plate and said membrane electrolyte, said first electrode comprising a first substrate having a pair of oppositely facing major planar surfaces and electrocatalyst associated therewith defining a first electrochemically active area; and a second electrode interposed between said second separator plate and said membrane electrolyte, said second electrode comprising a substrate having a pair of oppositely facing major planar surfaces and electrocatalyst associated therewith defining a second electrochemically active area;

said electrochemical fuel cell assembly further comprising a first reactant flow path for directing a first reactant fluid stream between said first and second ports, wherein said first reactant flow path extends substantially linearly across said first electrochemically active area, and the loading of said electrocatalyst varies substantially symmetrically as said electrode is traversed in-plane in the direction of said first reactant flow path.

* * * * *